(12) United States Patent
Wortman

(10) Patent No.: US 7,982,639 B1
(45) Date of Patent: Jul. 19, 2011

(54) DESERIALIZER CIRCUITRY INCLUDING CIRCUITRY FOR TRANSLATING DATA SIGNALS BETWEEN DIFFERENT FORMATS OR PROTOCOLS

(75) Inventor: Curt Wortman, San Jose, CA (US)

(73) Assignee: Altera Corporation, San Jose, CA (US)

( * ) Notice: Subject to any disclaimer, the term of this patent is extended or adjusted under 35 U.S.C. 154(b) by 57 days.

(21) Appl. No.: 12/552,069

(22) Filed: Sep. 1, 2009

(51) Int. Cl.
  *H03M 9/00* (2006.01)
(52) U.S. Cl. ........................................ 341/101; 327/115
(58) Field of Classification Search .................. 327/115, 327/117; 341/100, 101
  See application file for complete search history.

(56) References Cited

U.S. PATENT DOCUMENTS

| | | | |
|---|---|---|---|
| 6,483,888 B1 * | 11/2002 | Boerstler et al. | 377/47 |
| 6,617,893 B1 * | 9/2003 | Born et al. | 327/115 |
| 6,639,435 B2 * | 10/2003 | Holzle | 327/115 |
| 7,058,120 B1 * | 6/2006 | Lu et al. | 341/100 |
| 7,064,685 B1 | 6/2006 | Xue et al. | |
| 7,659,838 B2 * | 2/2010 | Nguyen et al. | 341/100 |
| 2008/0186064 A1 * | 8/2008 | Kirichenko | 327/117 |
| 2009/0322385 A1 * | 12/2009 | Rozen et al. | 327/115 |

* cited by examiner

*Primary Examiner* — Howard Williams
(74) *Attorney, Agent, or Firm* — Ropes & Gray LLP; Jeffrey H. Ingerman

(57) ABSTRACT

In order to help convert serial data, which includes extra protocol encoding bits, to parallel data having the protocol bits removed (or at least separated from the actual data), the serial data is at least partially deserialized using a low-speed clock having different frequencies at different times (typically different fractions of a high-speed serial data clock frequency at different times). This enables the partially deserialized data to include blocks of different numbers of the serial data bits. These blocks can be further assembled into groups of blocks having numbers of bits that correlate well with the number of bits in incoming serial data words. These groups can then be easily manipulated (e.g., to identify in them their extra protocol encoding bits). The circuitry can be set up to work with any of several different protocol encoding scheme.

20 Claims, 5 Drawing Sheets

64B66B Mode
- 32,34,32,34
- (8,8,8,8),(8,8,8,10),(8,8,8,8)
  (8,8,8,10)

FIG. 2

128B130B Mode
- 32,32,32,34
- (8,8,8,8),(8,8,8,8),(8,8,8,8)
  (8,8,8,10)

FIG. 3

64B67B Mode
- 32,34,34,34
- (8,8,8,8),(8,8,8,10),(8,8,8,10)
  (8,8,8,10)

FIG. 4

DESERIALIZER CIRCUITRY INCLUDING CIRCUITRY FOR TRANSLATING DATA SIGNALS BETWEEN DIFFERENT FORMATS OR PROTOCOLS

BACKGROUND OF THE INVENTION

This invention relates to circuitry for handling serial data signals such as high-speed serial data signals that may be used for conveying information between various devices (e.g., various integrated circuits) in a system (such as on a printed circuit board). Although the circuitry of this invention can be constructed from several discrete circuit components, a more typical implementation is in a single integrated circuit. Such an integrated circuit implementation of the invention can be in any of a wide range of devices such as microprocessors, microcontrollers, programmable logic devices ("PLDs"), field-programmable gate arrays ("FPGAs"), application-specific integrated circuits ("ASICs"), structured ASICs, and many other types of integrated circuits. (For convenience herein, PLDs, FPGAs, and all other devices of that general kind will be referred to generically as PLDs.)

Various serial data signal communication protocols employ a few more bits than the minimum number needed to actually represent the data being communicated. Such extra bits may be used for such purposes as indicating word alignment boundaries for block synchronization, parity checking, error correction coding, ensuring that there is no net direct current ("DC") in the data signal, etc. For example, several industry-standard codes have been or are being developed that transmit 66 bits for every 64 bits of "actual," "real," or "payload" data. Such a signalling or communication protocol may be referred to as 64B66B coding or the like. Another example of this type of code is 64B67B coding, in which 67 bits are transmitted for every 64 bits of actual data content. Still another example is 128B130B coding, which transmits 130 bits for every 128 bits of real data. For convenience herein, all bits that are transmitted in addition to the actual data bits will sometimes be referred to as extra bits of protocol encoding or the like. Thus in 64B66B encoding, the two extra bits beyond the 64 actual data bits may be referred to as extra protocol bits or the like. To distinguish the 64 actual data bits from those two extra protocol bits, the actual data bits may sometimes be referred to herein as the actual data bits or the like.

When a circuit device receives a serial data signal from another device, the receiving device ("the receiver") very often needs to convert that serial data to a more parallel form at a relatively early stage in the handling of the received information. For example, the receiver may need to convert the purely serial incoming signal to successive "bytes" or "words" of parallel data. (The term "byte" will sometimes be used as generic term for all such groups of parallel bits, regardless of how many bits are in such a group.) For example, each such byte may include (in parallel) a respective group of 8, 10, 16, 20, 32, 40, or more successive bits from the received serial data signal. In addition to thus converting the received data from serial to parallel form, other objectives of such early handling of the incoming data may be (1) to discard or at least identifiably separate any extra protocol encoding bits from the actual data bits, (2) to "align" the parallel data bits with predetermined "boundaries" for valid bytes of data, etc.

It can be a challenging task to accomplish all of the foregoing functions efficiently, especially for serial data signals that are received at very high data rates (e.g., 10 gigabits per second and higher), and even more especially in the case of "general purpose" circuitry (such as a PLD) that is intended to be able to handle any of several different communication protocols in different possible uses of the PLD.

SUMMARY OF THE INVENTION

In accordance with certain possible aspects of the invention, deserializer circuitry is provided that can deserialize successive groups of incoming serial data bits, the number of bits in different ones of the groups being controllably variable. This allows the deserializer circuitry to produce parallel output data that can be matched in size to different incoming word sizes, and it also helps the deserializer circuitry to effect byte alignment of the parallel data, as well as separation of the extra protocol encoding bits from the actual data bits.

The deserializer circuitry may also be controllably variable so that it can support any of several different serial data signalling protocols (e.g., with any of several different relationships between actual data bits and extra protocol encoding bits).

Further features of the invention, its nature and various advantages, will be more apparent from the accompanying drawings and the following detailed description.

BRIEF DESCRIPTION OF THE DRAWINGS

FIG. 2 is a simplified depiction of an illustrative operating sequence in accordance with certain possible aspects of the invention.

FIG. 3 is a simplified depiction of another illustrative operating sequence in accordance with certain possible aspects of the invention.

FIG. 4 is a simplified depiction of still another illustrative operating sequence in accordance with certain possible aspects of the invention.

FIG. 6 also includes simplified depictions of some illustrative data patterns in accordance with certain possible aspects of the invention.

DETAILED DESCRIPTION

Figure 1:
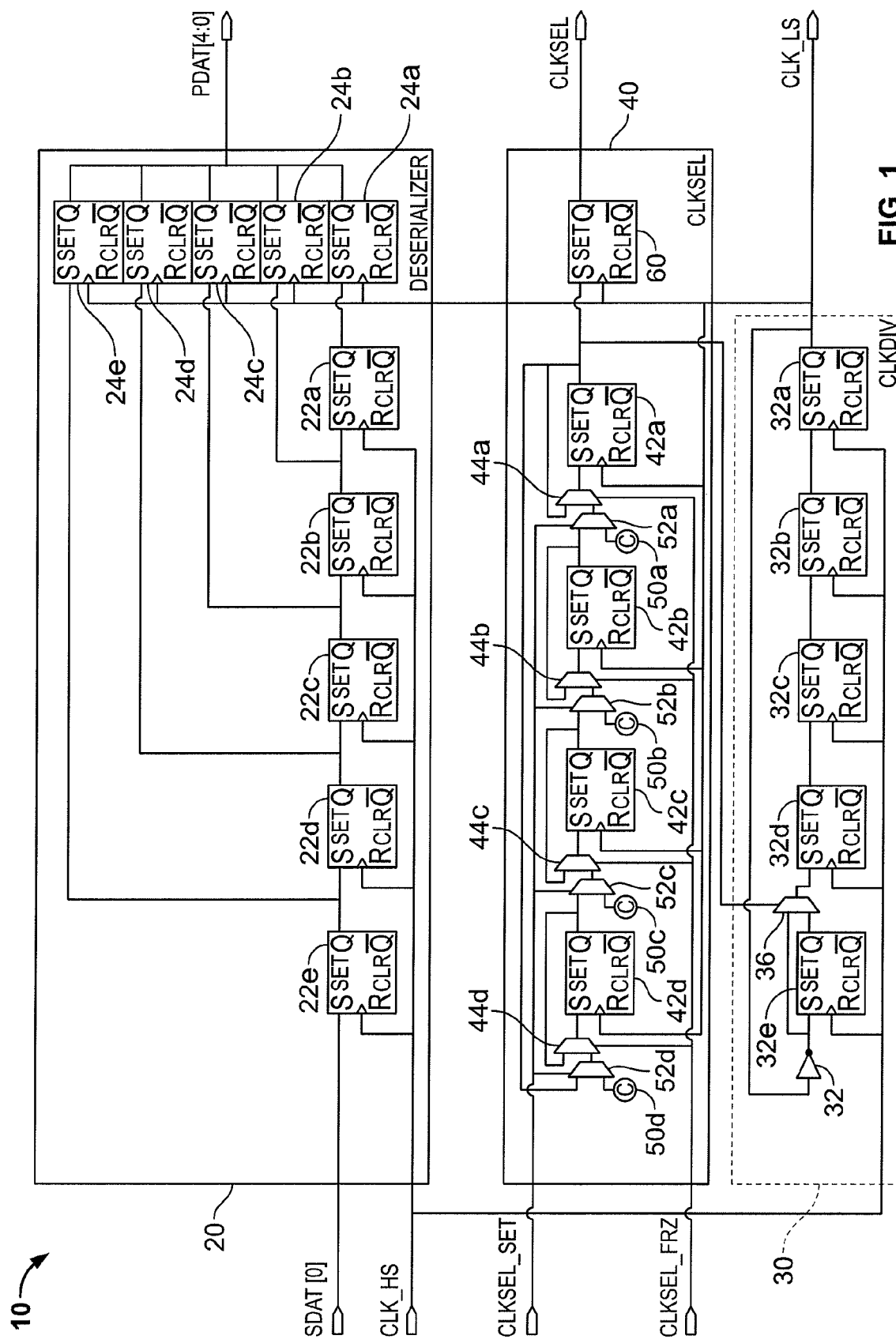
FIG. 1 is a simplified schematic block diagram of an illustrative embodiment of circuitry constructed in accordance with certain possible aspects of the invention.

FIG. 1 shows an illustrative embodiment of circuitry 10 in accordance with the invention that can be used to deserialize incoming serial data into successive groups of parallel data bits, with the number of bits in each successive group being controllably variable so that circuitry 10 can also function to help separate incoming extra protocol encoding bits from incoming actual data bits. The FIG. 1 circuitry also has other capabilities that will be more apparent as the description proceeds. FIG. 1 shows circuitry 10 having a particular illustrative configuration (which will be described in detail below), but it will be understood that this configuration is only an example, and that changes to this configuration can be made if desired. For example, the embodiment of circuitry 10 that is shown in FIG. 1 can output either 8 parallel bits or 10 parallel bits, but circuitry 10 can be sized differently so that these minimum and maximum parallel output bit group sizes can be larger or smaller than the above-mentioned particular numbers.

A point that should be noted about FIG. 1 is that it may be somewhat simplified relative to some other possible embodiments of the circuitry. For example, FIG. 1 shows deserializer 20 receiving only a single serial data stream and outputting up to 5 parallel data bits. But the parallel output bus width can be increased from 5 bits to 10 bits by any of several techniques such as by using dual-edge flip-flops for registers 22/24 or by using flip-flops that can hold two bits. One set of bits would be processed with positive edge triggering (e.g., for "even" bits) and the other set of bits would be processed with negative edge triggering (e.g., for "odd" bits). This can help to reduce the switching frequency of the high-speed clock CLK_HS. Other ways to increase the width of the parallel output bus PDAT include increasing the numbers of each type of register 22 and 24 in deserializer 20, or by providing two parallel instances (repetitions) of what is shown for deserializer 20 in FIG. 1 (with one instance operating on "even" bits in the serial data input stream, with the other instance operating on "odd" bits in the serial data input stream, and with the parallel outputs of the two instances interleaved with one another so that the bits have the same bit positions relative to one another coming out of the deserializer circuitry that they had going into that circuitry). The above techniques can also be used, possibly in combination with one another, to further increase the parallel output bus width of circuitry 20 to 20 bits, or to a number even larger than 20 bits if desired.

As shown in FIG. 1, deserializer circuitry 20 includes a plurality (i.e., five) flip-flops or registers 22a-e that are connected in series to form a shift register for shifting in successive bits in the serial data signal SDAT[0] that is applied to the first register 22e in the series. Registers 22 are all clocked in parallel by a high-speed clock signal CLK_HS, which has the same frequency as the bit rate of the incoming SDAT[0] signal, and which is also appropriately phase-synchronized with that SDAT signal. Accordingly, each successive bit in the applied SDAT signal is stored successively in registers 22e through 22a during successive cycles of the CLK_HS signal.

As will be described in later paragraphs, during every fourth or fifth cycle of the CLK_HS signal, a low-speed clock signal CLK_LS is asserted to cause the then-current outputs of registers 22e through 22a to transfer in parallel to flip-flops or registers 24e through 24a, respectively. The parallel outputs of registers 24e through 24a are the parallel data outputs PDAT of deserializer circuitry 20.

In FIG. 1, the elements surrounded by box 30 comprise a clock frequency divider ("CLKDIV") circuit. CLKDIV circuit 30 includes five flip-flops or registers 32a-e, inverter 34, and multiplexer ("mux") 36. Registers 32 are basically connected in a closed loop series (in order from 32e to 32a and then back to 32e again). This structure is therefore like a recirculating shift register. However, the output signal of register 32a is inverted by inverter 34 prior to application to register 32e (or 32d), and register 32e can be selectively or controllably bypassed via mux 36. All of registers 32 are clocked by the high-speed clock signal (CLK_HS). The output signal of register 32a is a low-speed clock signal ("CLK_LS"), which has a frequency that is either one-quarter or one-fifth the frequency of the high-speed clock. In particular, CLK_LS is one-fifth CLK_HS when all of registers 32e through 32a are in the closed loop series in CLKDIV circuit 30. CLK_LS is one-quarter CLK_HS when register 32e is bypassed via mux 36, so that only registers 32d through 32a are effectively in use in the closed loop series. Note that the low-speed clock signal output by CLKDIV circuit 30 is used to clock registers 24 in deserializer 20. This low-speed clock signal is also used to clock an output register 60 of clock select ("CLKSEL") circuit 40, which will be described in later paragraphs of this specification.

Whether or not register 32e is effectively included in the closed loop series in CLKDIV circuit 30 depends on the state of an output signal of clock select (CLKSEL) circuit 40. This is the output signal of circuit 40 that is applied to the selection control input terminal of mux 36. (As in the case of all muxes herein, the logical state of the signal applied to the selection control input of the mux determines which of its two selectable inputs the mux connects to its output.) Circuit 40 has two output signals. One of these output signals is a CLKSEL signal that is applied to the input of register 60. The other of these outputs signals is a CLKSEL signal output by register 60. Thus the second CLKSEL signal is the same as the first, but delayed by one low-speed clock signal cycle. For many purposes in this discussion the timing difference between these two CLKSEL signals does not matter, and so both will be referred to simply as CLKSEL except where it becomes important to use more precise terminology.

CLKSEL circuit 40 includes four registers 42d through 42a, configuration memory cells or other similar elements 50d through 50a, muxes 52d through 52a, and muxes 44d through 44a. Elements with the same letter as part of their reference symbols may be thought of as being "associated" with one another. CLKSEL circuit 40 also includes above-mentioned output register 60.

Registers 42d through 42a are basically connected in a closed loop series (again, like a recirculating shift register). In other words, data can shift from register 42d, successively through registers 42c, 42b, and 42a, and then back to register 42d. The output of register 42a is the CLKSEL signal applied to the selection control input of mux 36, and also to output register 60. Registers 42 are all clocked by the low-speed clock output by CLKDIV circuit 30. When a CLKSEL_SET signal (applied to the selection control inputs of all of muxes 52) is asserted, each of registers 42 can be loaded with data (i.e., a 1 or a 0) from the associated configuration memory circuit element 50 (assuming that the below-described CLKSEL_FRZ signal is not also asserted at the same time). The shifting of data through registers 42 can be stopped at any time by asserting the CLKSEL_FRZ signal (which is applied to the selection control inputs of all of muxes 44). Thus asserting CLKSEL_FRZ causes each of muxes 44 to route the output of the associated register 42 back to the input of that register so that each register continues to hold its data content (rather than passing its current data content on to the next (succeeding or downstream) register 42, or accepting new data from the preceding (or upstream) register. An objective of this feature is to create a clock cycle slip, essentially dropping a bit.

Any pattern of data can be stored in configuration memory cells 50. This data can then be loaded into registers 42 at any desired time (i.e., by asserting CLKSEL_SET, while de-asserting CLKSEL_FRZ). Normally the data loaded into registers 42 is subsequently recirculated through those registers in synchronism with the low-speed clock output by CLKDIV circuit 30. However, this recirculation can be halted (typically temporarily) at any time by asserting CLKSEL_FRZ. The output signal of register 42a controls whether the frequency of the low-speed clock is one-quarter or one-fifth the frequency of the high-speed clock. (For example, when the output of register 42a is a 1, the low-speed clock may be one-fifth the high-speed clock, and when the output of register 42a is a 0, the low-speed clock may be one-quarter the high-speed clock. This logic may, of course, be reversed if desired.) The relative speed of the low-speed clock, in turn, determines whether deserializer circuit 20 outputs four, new, parallel bits (from registers 24a-24d) or five, new, parallel bits (from registers 24a-24e). From this it will be seen how circuitry 10 can be used to assemble from serial data input SDAT blocks (bytes) of parallel data PDAT that have any of several different numbers of bits in those parallel data blocks.

The length of the recirculating chain of registers 42 in CLKSEL circuit 40 can be different from the four-register example shown in FIG. 1. For example, this chain can include any plural number of registers 42 and can therefore be of any desired length. In particular, the next several paragraphs of this discussion assume that there are 16 registers 42 in the closed loop chain of such registers in CLKSEL circuit 40. In all cases (as in the following discussion) it is assumed that each such register 42 has (respectively) associated with it all of the other circuit elements 44, 50, and 52 that are shown associated with each of the representative registers 42 that are depicted in FIG. 1. Again, the next several paragraphs assume that there are 16 registers 42 in the closed loop chain of registers in CLKSEL circuit 40. The next several paragraphs also assume that the parallel data output bus from deserializer 20 is 10 bits wide (i.e., PDAT[9:0]) rather than 5 bits wide as shown in FIG. 1. This greater PDAT bus width can be achieved in any of the ways that are described earlier in this specification.

FIG. 2 shows an example of how the FIG. 1 circuitry (but with 16 rather than only four registers 42, and with output bus width PDAT[9:0]) can be operated to convert successive groups of 66 serial data bits to groups of 64 parallel output bits (with the two extra protocol encoding bits in each 66-bit group well segregated (in predetermined locations) from the other 64 data bits). As in the above discussion, it is assumed that a 1 output by the last register 42 in the chain and applied to the selection control input of mux 36 causes CLK_LS to be one-fifth CLK_HS, while a 0 output of that same kind causes CLK_LS to be one-quarter CLK_HS. Accordingly, for the FIG. 2 example, the data in 16 configuration elements 50 (from left to right in FIG. 1) is 0000000100000001. Each 0 in this data (when recirculated in registers 42) causes deserializer 20 to output eight bits in parallel when that 0 reaches the last register 42 in the chain. On the other hand, each 1 in this data causes deserializer 20 to output ten bits in parallel when that 1 reaches the last register 42 in the register chain. The two extra bits in each such ten-bit output come from the top register(s) (like 24e) in the deserializer. Except when deserializer 20 is thus outputting ten bits in response to 1 being applied to the selection control input of mux 36, the outputs of top register(s) 24e can be ignored.

Consistent with what has been said in the immediately proceeding paragraph, when the FIG. 1 circuitry is being used to support 64B66B mode, FIG. 2 shows the FIG. 1 circuitry outputting a repeating pattern of seven groups of 8 parallel bits followed by one group of 10 parallel bits. By means of parentheses, FIG. 2 further shows that a first four of such groups of 8 parallel bits can constitute the initial 32 bits of a 66-bit block, and a second three of such groups of 8 parallel bits and the succeeding 10-bit group can constitute the final 34 bits of a 66-bit block. Later in this specification we will show illustrative circuitry for producing and working with such 32- and 34-bit sub-blocks in parallel.

FIG. 3 shows how the FIG. 1 circuitry can be operated to support 128B130B mode data. In this case, the data in 16 registers 50 can be (from left to right) 0000000000000001. Again, this data is recirculated through 16 registers 42 to cause the FIG. 1 circuitry to repeatedly output 15 groups of eight parallel bits followed by one group of ten parallel bits. As FIG. 3 shows, this parallel data can be further parallelized to three groups of 32 parallel bits followed by one group of 34 parallel bits, with the two extra protocol encoding bits being the last two bits in the 34-bit group.

FIG. 4 shows how the FIG. 1 circuitry can be operated to support 64B67B mode data. In this case, the data in 16 register 50 can be (from left to right) 0000000100010001. As this data recirculates through 16 registers 42, it causes output of seven groups of eight parallel bits, one group of ten parallel bits, three groups of eight parallel bits, one group of ten parallel bits, three groups of eight parallel bits, and one group of ten parallel bits. When further parallelized to groups of 32 or 34 bits, the first 64-bit word is correctly aligned, but the second 64-bit word is shifted by one bit position. However, two-to-one mux circuitry can be used to bring this data back into proper alignment with the output data path. (See later discussion, especially of FIG. 7.)

Figure 5:
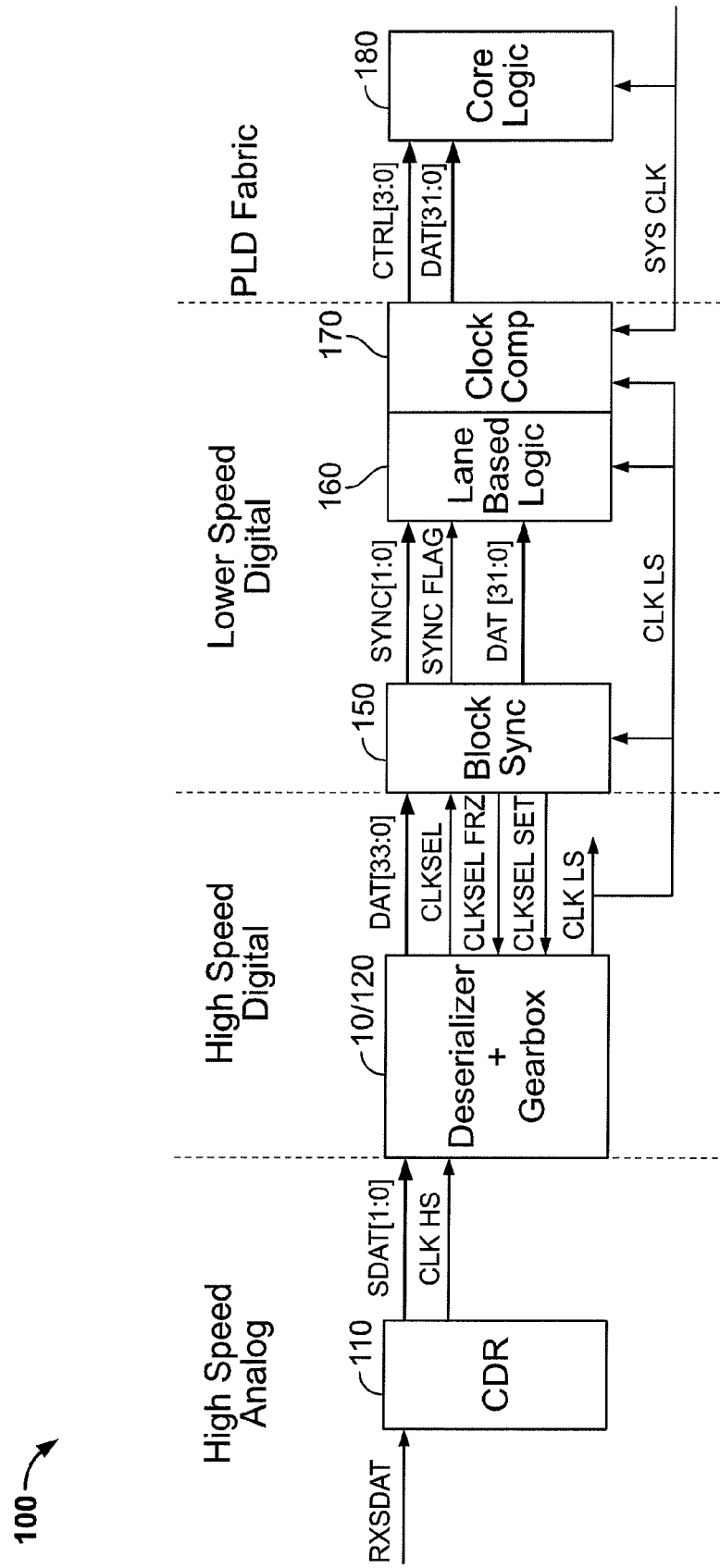
FIG. 5 is a simplified block diagram of an illustrative embodiment of additional circuitry in accordance with certain possible aspects of the invention.

FIG. 5 shows an illustrative embodiment of how circuitry of the type shown in FIG. 1 may be used in a larger context on an integrated circuit 100 such as a PLD. As shown in FIG. 5, illustrative integrated circuit ("IC") 100 includes clock and data recovery ("CDR") circuitry 110 in a so-called high-speed analog portion of the circuitry. CDR circuitry 110 receives a high-speed serial data signal RXSDAT that is applied to IC 100, typically from an external source. CDR circuitry 110 (which can be previously known circuitry) recovers from RXSDAT a retimed serial data signal, from which it outputs alternate "odd" and "even" bits in two serial data streams SDAT[1:0] in synchronism with a clock signal CLK_HS (which CDR 110 has also recovered from RXSDAT). "Odd" and "even" bits can be produced by capturing data from RXSDAT on both rising and falling edges in the recovered clock. The SDAT[1:0] and CLK_HS outputs of CDR 110 are applied to a so-called high-speed digital portion of device 100.

Figure 6:
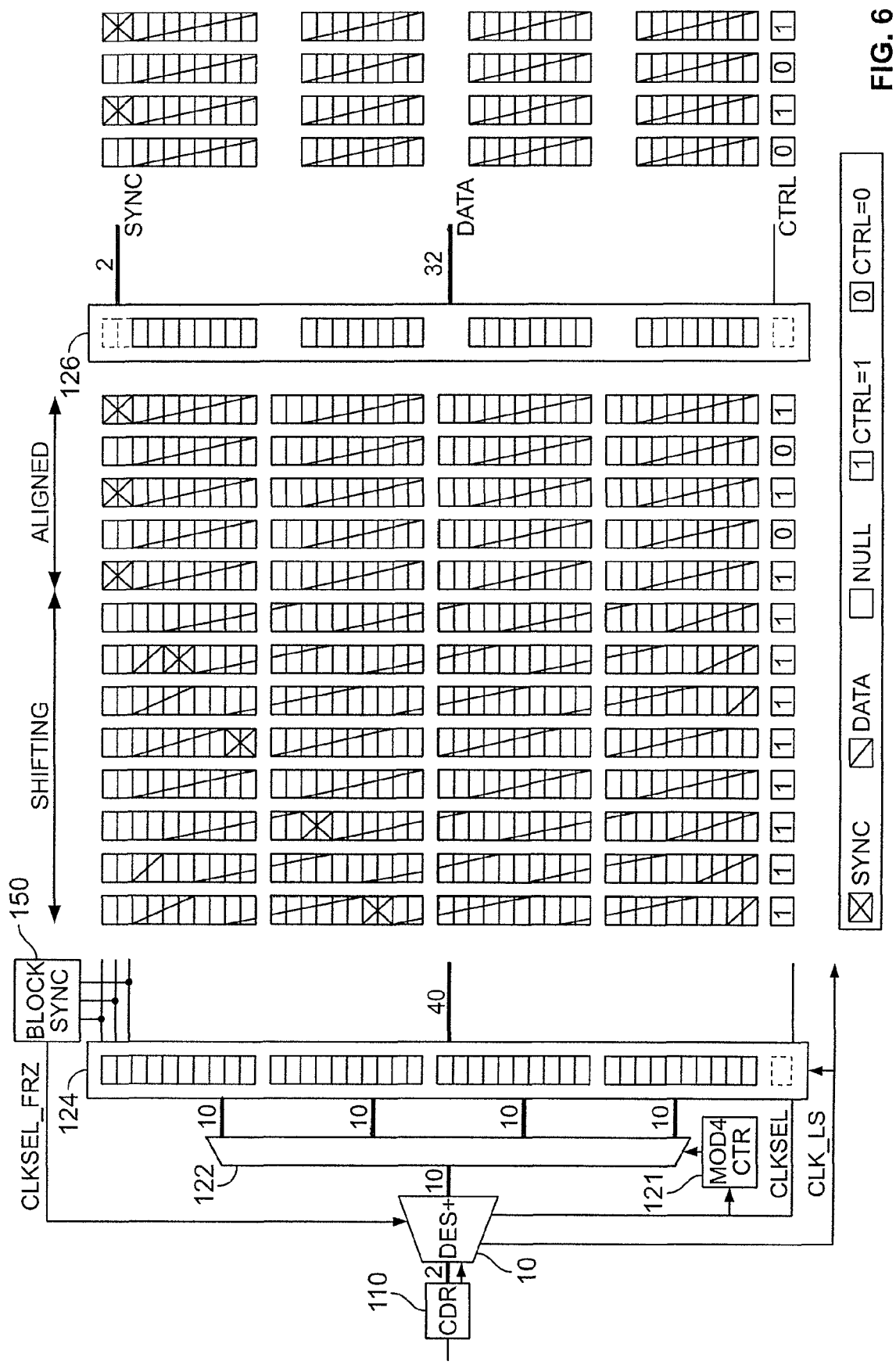
FIG. 6 is a simplified block diagram of an illustrative embodiment of still more circuitry in accordance with certain possible aspects of the invention.

The high-speed digital portion of device 100 includes deserializer and gearbox circuitry 10/120. The portion 10 of this circuitry has already been described in connection with FIG. 1 (which description included discussion of various ways in which deserializer 20 can be constructed to operate on "odd" and "even" data bit streams like SDAT[1:0]). Further portions 120 of this circuitry are shown in FIG. 6 and described in the next paragraph. Note that the word "gearbox" as used in FIG. 5 refers to the ability of this circuitry to facilitate such data communication protocol conversions as 66B to 64B, 130B to 128B, 67B to 64B, etc.

FIG. 6 shows that successive groups of ten parallel outputs from circuitry 10 (e.g., as in FIG. 1) may be further parallelized to blocks of 40 parallel bits, each of which blocks can then be further refined to blocks of 34 bits (which can include 32 data bits and up to two protocol encoding bits). This further parallelizing circuitry 120 can include demultiplexer 122 for routing each successive group of ten parallel bits output by circuitry 10 to a respective group of ten registers in register array 124. This is done on a progressive and recirculating or rotating basis (e.g., first ten parallel outputs from circuitry 10 going to bottom-most ten registers in array 124, next ten outputs from circuitry 10 going to next-to-bottom-most ten registers in array 124, and so on until all 40 registers in array 124 are full). A modulo 4 counter 121 (clocked by CLK_LS) can be used to control demux 122 to perform this routing.

To the right of registers 124 in FIG. 6 is some graphical information that will be described in full detail later in this specification, but which it will be sufficient here to briefly mention as relating to how the circuitry can be operated to ensure that extra protocol encoding bits ultimately came out from registers at the top of register array 124 and downstream register array 126. Assuming that this "alignment" or "synchronization" of the data has been achieved, then thereafter it is known that each of the lower three ten-register groups in array 124 contains only eight bits of meaningful data (typically in the lower-most eight registers in that ten-register group (although there can be exceptions to this, which will be discussed as a possible refinement later)). Thus only the lower-most eight registers in each of the three lower groups of ten registers in array 124 need to be transferred to register array 126. It is therefore possible for register array 126 to have only 34 registers, (rather than 40 registers as in array 124). As in register array 124 the lower 32 registers in register array 126 will always contain data, while the upper two registers may contain extra protocol encoding bits.

Returning to FIG. 5, the connections between circuitry 10/120 and downstream circuitry such as block sync circuitry 150 will now be clear. For example, these connections include 34 parallel data and protocol encoding outputs from register array 126 (referred to as DAT[33:0] in FIG. 5). The connections to downstream circuitry also include the CLKSEL output signal of register 60 in FIG. 1. The low-speed clock signal CLK_LS from register 32a in FIG. 1 is also an output of circuitry 10/120. Flowing back to circuitry 10/120 from block sync circuitry 150 are the CLKSEL_FRZ and CLKSEL_SET signals.

Block synchronization ("sync") circuitry 150 is part of the so-called lower-speed digital portion of IC 100. A purpose of circuitry 150 is to help make sure that the extra protocol encoding bits in the data stream ultimately appear in the top-most registers in array 124. Circuitry 150 therefore typically includes circuitry that can "look at" the data in register array 126, and if that data does not include protocol encoding data in the top-most register 126 for at least some of the loadings of those registers, then circuitry 150 can assert the CLKSEL_FRZ signal long enough to cause deserializer 20 to somewhat shift the synchronism of the parallel data outputs PDAT relative to the serial data inputs SDAT. Such synchronism shifting is attempted repeatedly until circuitry 150 eventually finds that the extra protocol encoding bits are in fact in the two upper-most registers in array 126. For high-speed synchronous control, a meta-stable hardening circuit followed by edge detection can be used. This is very typical for slow-changing signals crossing clocking domains and used as control.

A central portion of FIG. 6 shows an example of how such shifting may take place (under the heading "shifting" in that FIG.). Each column of small boxes indicates the contents of registers 124 at any given time. Boxes that are empty contain no needed information. Boxes that are single cross-hatched contain data. Boxes that are double cross-hatched contain extra protocol encoding bits. (This example is for 64B66B coding.)

Figure 7:
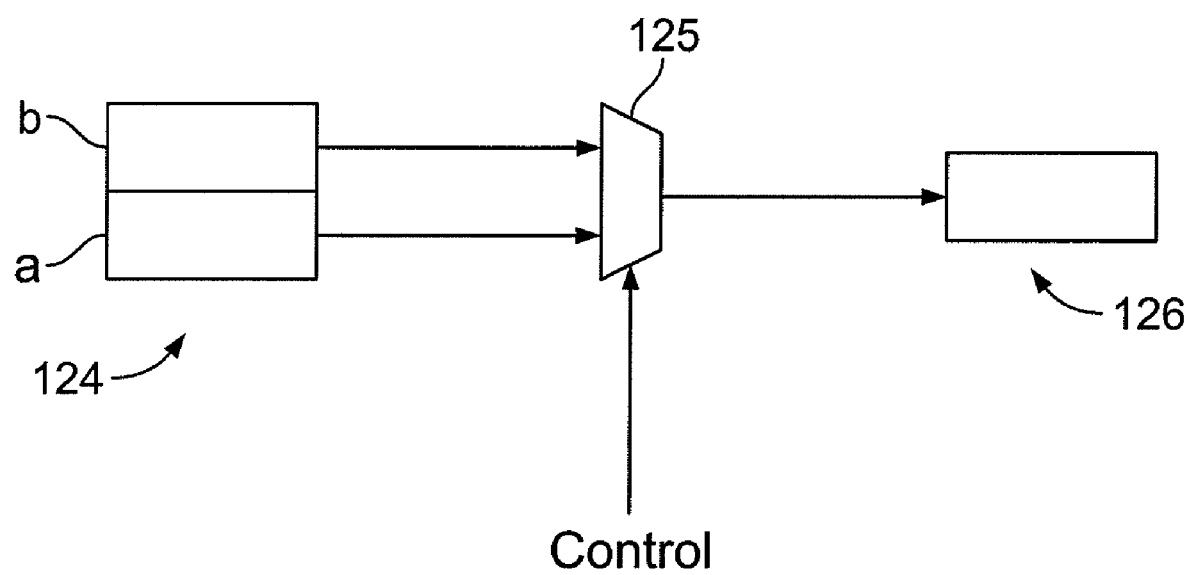
FIG. 7 is a simplified block diagram of an illustrative embodiment of still more possible circuitry in accordance with the invention.

Under the heading "shifting" in FIG. 6 it will be seen how the extra protocol encoding bits gradually shift up to the top-most registers 124 (as a result of repeated brief assertions of the CLKSEL_FRZ signal by block sync circuitry 150). When the data is finally properly aligned (as shown under the heading "aligned" in FIG. 6), the extra protocol encoding bits are always in the top two of registers 126. This is recognized by circuitry 150, which thereafter ceases assertion of the CLKSEL_FRZ signal, thereby allowing continued properly synchronized (aligned) operation of the circuitry. (A 2:1 mux as shown in FIG. 7 and described in more detail later can be used to perform a single-bit shift versus a two-bit shift as shown in FIG. 6.)

The data under "aligned" in FIG. 6 also makes the point that when such alignment is achieved, the top two registers 124 in each of the lower three groups of ten such registers can (at least in this example) always be ignored, which is the basis on which only 24 of these 30 registers 124 need to have their contents transferred to register array 126. FIG. 5 shows that block sync circuitry 150 can output the contents of the top two registers 126 as signals SYNC[1:0], and that it can output the contents of the bottom 32 registers 126 as signals DAT[31:0]. Circuitry 150 can also output a SYNC FLAG signal to indicate when it has determined that it is outputting properly aligned data (i.e., only data in the DAT[31:0] signals, and only extra protocol encoding bits in the SYNC[1:0] signals).

Other components of the lower-speed digital portion of IC 100 that are shown in FIG. 5 are lane based logic circuitry 160 and clock compensation circuitry 170. Lane based logic 160 may be (previously known) circuitry for eliminating (or compensating for) skew between the arrival time of the depicted RXSDAT signal and one or more similar signals in other instances ("lanes") on device 100 of circuit elements like 110, 10/120, and 150. Such lane de-skewing is well known, is not germane to the present invention, and therefore need not be discussed further herein.

Clock compensation circuitry 170 may be first-in/first-out ("FIFO") register or memory circuitry that receives and stores data (from upstream elements like 160) in synchronism with the low-speed clock signal CLK_LS, and that subsequently outputs that same data (to downstream elements like 180) in the order received in synchronism with a system clock signal SYS_CLK (e.g., a clock signal used by downstream circuitry 180). Circuitry 170 can therefore act as a buffer for data transferring between two different clock regimes (CLK_LS and SYS_CLK), which may have different phases and/or even slightly different frequencies. It should also be borne in mind that whereas SYS_CLK is typically a signal with one constant frequency, CLK_LS is not such a signal. Rather, in accordance with the present invention, CLK_LS has different clock period widths at different times (i.e., sometimes its clock period width is four times the CLK_HS clock period width, and sometimes its clock period width is five times the CLK_HS clock period width). (In general, frequency and period or period width have a reciprocal (inverse) relationship to one another.) Thus one of the purposes and functions of circuitry 170 is to buffer the transfer of data between a clock signal (CLK_LS) having irregular (non-constant) period width and a clock signal (SYS_CLK) having a regular (constant) period width.

The final circuitry shown in FIG. 5 is core logic 180 (in the PLD fabric portion of IC 100 in the illustrative case in which IC 100 is a PLD). Circuitry 180 (which can be previously known) makes any desired use of the data (DAT[31:0]) it receives from FIFO 170. Such data may also be accompanied by control signal information (CTRL[3:0}), which may indicate (for example) which one of two 32-bit sub-blocks of a 64-bit data word is currently being supplied, or (as another example) which one of four sub-blocks of a 128-bit data word is currently being supplied.

It was mentioned in the earlier discussion of FIG. 4 that some modes such as 64B67B may cause some of the data in register array 124 to be shifted (e.g., by one bit position) relative to the desired output of that data from register array 126. This may be true for such a mode even after the data has basically been aligned (e.g., as under the heading "aligned" in FIG. 6). If that is the case, then an array of two-to-one multiplexers can be included in the circuitry between registers 124 and registers 126. FIG. 7 shows one such (representative) mux 125. Normally mux 125 is controlled to pass the output of register a to register 126. But when it is necessary to shift data from registers 124 by one bit position, mux 125 can be controllably switched to pass the output of register b to register 126.

An alternative implementation for 64B67B uses an instance of circuit 20 that can produce a pattern of 32 bits (4444, 4444) or a pattern of 35 bits (4444, 4555) for a total of 67 bits. This would eliminate the need for circuitry 125. FIG. 6 would have a different demultiplexer implementation, enabling registers 124 to accumulate up to 40 bits (i.e., a maximum of 5 PDAT[4:0] bits in response to each of 8 successive CLK_LS cycles). The 40 bits output by registers 124 would be hard-wired to 35 registers 126. The data would be shifted (as under "shifting" in FIG. 6) until the three protocol encoding bits began to appear in the top three registers 126 in alternate loadings of those registers.

In some respects recapitulating and extending the foregoing, possibly in somewhat different terms, in accordance with certain possible aspects of the invention, clock divider circuitry (e.g., 30) may include a plurality of registers (e.g., 32) connected in a closed loop series. The registers may be clocked by a high-speed clock signal (e.g., CLK_HS). An output signal of one of the registers (e.g., 32a (arbitrarily referred to as a "first" register)) may be a low-speed clock signal (e.g., CLK_LS). The clock divider circuitry may further include bypass circuitry (e.g., 36) for selectively bypassing another of the registers in the series (e.g., 32e (arbitrarily referred to as a "second" register)). The clock divider circuitry may still further include control circuitry (e.g., 40) for successively applying a plurality of control signals (e.g., ultimately from memory cells 50) to the bypass circuitry to control whether the bypass circuitry bypasses the second register.

The above-mentioned control circuitry may include a closed loop shift register (e.g., 42) having a plurality of stages (e.g., 42a through 42d). The above-mentioned control signal may be responsive to an output signal of a first of the stages (e.g., 42a (again, "first" is just an arbitrary term of reference)). The above-mentioned shift register may be clocked responsively to the low-speed clock signal (e.g., CLK_LS).

The above-described circuitry may further include freeze control circuitry (e.g., 44) for selectively stopping shifting of the shift register.

The above-described circuitry may include memory circuitry (e.g., 50) for storing control data for use in producing the control signals. The circuitry may further include set control circuitry (e.g., 52) for selectively loading the control data from the memory circuitry into the shift register.

The above-described clock divider circuitry may be used in deserializer circuitry, which may further include serial data memory circuitry (e.g., 22) for serially accepting and storing a plurality of data bits (e.g., SDAT) that are received successively in synchronism with the high-speed clock signal. The deserializer may still further include parallel data memory circuitry (e.g., 24) for accepting, in parallel and in synchronism with the low-speed clock, at least a subplurality (e.g., from 22a-d to 24a-d) of the data stored in the serial memory circuitry.

The above-described deserializer circuitry may operate on data bits (e.g., SDAT) that include successive pluralities of actual data bits (e.g., single cross-hatched data groups in FIG. 6) with at least one extra protocol encoding bit (e.g., double cross-hatched data bits in FIG. 6) between each successive plurality of actual data bits.

The above-mentioned parallel data memory circuitry (e.g., 24) may have capacity for storing only a subplurality of the actual data bits in one of the above-mentioned pluralities of actual data bits plus at least one extra protocol encoding bit (e.g., registers 24 can only store eight actual data and two protocol encoding bits, not all 64 actual data bits between the extra bits in (for example) 64B66B mode). The deserializer circuitry may then further include extended parallel data memory circuitry (e.g., 124) having a plurality of portions, each of which can store parallel outputs of the parallel data memory circuitry (e.g., 24). Routing circuitry (e.g., 122) may be provided for routing the parallel outputs of the parallel data memory circuitry to respective different ones of the portions (e.g., in 124) in successive different cycles of the low-speed clock signal.

The deserializer circuitry may further include alignment control circuitry (e.g., 150) for changing phase of operation of the clock divider circuitry (e.g., using temporary assertion of CLKSEL_FRZ) relative to location of the extra protocol encoding bits in the serial data signal (e.g., SDAT), until each extra protocol encoding bit is received in a predetermined location (e.g., top-most bit positions under "aligned" in FIG. 6) in the extended parallel data memory circuitry (e.g., 124). "Phase of operation of the clock divider circuitry," "phase of the low-speed clock signal," or the like refers to at what times or where in the train or waveform of the low-speed clock the frequency of that signal switches to the lower of its two possible frequencies. Because the "period" of the low-speed clock signal is the reciprocal of its of its frequency (i.e., period is seconds per cycle, rather than cycles per second as in the case of frequency), "phase" of the low-speed clock signal also refers to when in the waveform of that signal the signal period switches to the longer of its two possible period lengths.

The deserializer circuitry may additionally include further extended parallel data memory circuitry (e.g., 126) having capacity for receiving in parallel from the extended parallel data memory circuitry (e.g., 124) all actual data bits contained in the extended parallel data memory, but with no extra capacity for extra protocol encoding bits embedded within those actual data bits (e.g., the lower 32 data locations in 126 have no embedded "sync" or "null" capacity).

Certain possible aspects of the invention may relate to a method of deserializing a serial data signal (e.g., SDAT) that includes successive pluralities of actual data bits (e.g., single cross-hatched in FIG. 6) with at least one extra protocol encoding bit (e.g., double cross-hatched in FIG. 6) between successive pluralities of the actual data bits. The bits in the serial data signal may be synchronized with a high-speed serial clock signal (e.g., CLK_HS). The method may include producing from the high-speed clock signal a low-speed clock signal (e.g., CLK_LS) having different first and second clock signal periods at different times (see the above discussion of "clock period widths"). (Again, "first" and "second" are arbitrary reference terms.) For example, when the frequency (cycles per second) of CLK_LS is one-quarter the frequency of CLK_HS, the first period (seconds per cycle) of CLK_LS is four times the period of CLK_HS. But when the frequency of CLK_LS is one-fifth the frequency of CLK_HS, the second period of CLK_LS is five times the period of CLK_HS. The first period of CLK_LS may be proportional to the time required to receive a predetermined fraction of the number of bits in each of the pluralities of actual data bits (e.g., when the period of CLK_LS is four times the period of CLK_HS, eight of a group of 64 bits can be received during one period of CLK_LS). The second period of CLK_LS may be proportional to the time required to receive the above-mentioned predetermined fraction plus at least one of the extra protocol encoding bits (e.g., when the period of CLK_LS is five times the period of CLK_HS, eight actual data and two protocol encoding bits can be received during one such extended period of CLK_LS).

A method such as above may further include using the high-speed clock signal (e.g., CLK_HS) to shift the serial data signal (e.g., SDAT) into multiple stages (e.g., 22e through 22a) of serial data memory circuitry (e.g., 22). The method may further include using the low-speed clock signal (e.g., CLK_LS) to transfer, in parallel, outputs of the multiple stages (e.g., 22e through 22a) to parallel data memory circuitry (e.g., 24).

A method such as above may still further include changing phase of the low-speed clock signal (e.g., when in the waveform of CLK_HS the period of that signal changes from the first period to the second period) relative to locations of the extra protocol encoding bits (e.g., double cross-hatched bits in FIG. 6) in the serial data signal (e.g., SDAT) until the extra protocol encoding bits become stored in at least one predetermined location (e.g., top-most locations under "aligned" in FIG. 6) in the parallel data memory circuitry (e.g., 24).

Other possible aspects of the invention may relate to circuitry for deserializing a serial data signal (e.g., SDAT) that includes successive pluralities of actual data bits (e.g., single cross-hatched in FIG. 6) with at least one extra protocol encoding bit (e.g., double cross-hatched in FIG. 6) between successive pluralities of actual data bits. The bits in the serial data signal may be synchronized with a high-speed clock signal (e.g., CLK_HS). The deserializer circuitry may include clock divider circuitry (e.g., 30) for producing from the high-speed clock signal a low-speed clock signal (e.g., CLK_LS) having different first and second clock signal periods (e.g., four and five times the period of CLK_HS, respectively) at different times. The first period may be proportional to a time required to receive a predetermined fraction (e.g., eight) of the number of bits in each of the pluralities (e.g., 64) of actual data bits. The second period may be proportional to the time required to receive that fraction of actual data bits plus at least one of the extra protocol encoding bits.

Deserializer circuitry as described in the preceding paragraph may further include serial data memory circuitry (e.g., 22) for shifting successive bits of the serial data signal (e.g., SDAT) into multiple stages (e.g., 22e through 22a) of the serial data memory circuitry in synchronism with the high-speed clock signal (e.g., CLK_HS). The deserializer circuitry may still further include parallel data memory circuitry (e.g., 24) for receiving, in parallel, outputs of multiple stages of the serial data memory in synchronism with the low-speed clock signal (e.g., CLK_LS).

The immediately above-described deserializer circuitry may yet further include clock synchronization circuitry (e.g., 150) for change phase of the low-speed clock signal (e.g., CLK_LS; the meaning of "phase" of such a signal has been described earlier) relative to locations of the extra protocol encoding bits (e.g., double cross-hatched) in the serial data signal (e.g., SDAT) until the extra protocol encoding bits become stored in at least one predetermined location (e.g., top-most locations under "aligned" in FIG. 6) in the parallel data memory circuitry.

Deserializer circuitry such as that being described may further include clock select circuitry (e.g., 40) for controlling when the clock divider circuitry (e.g., 30) produces the low-speed clock signal (e.g., CLK_LS) with the first period (e.g., four times the period of CLK_HS), and when the clock divider circuitry produces the low-speed clock signal with the second period (e.g., five times the period of CLK_HS).

In such deserializer circuitry, the clock synchronization circuitry (e.g., 150) may include circuitry (e.g., 40) for changing when the clock divider circuitry (e.g., 30) produces the low-speed clock signal with the first period, and when the clock divider circuitry produces the low-speed clock signal with the second period.

Deserializer circuitry such as that being described may include control signal memory circuitry (e.g., 50) for storing signals for determining a sequence in which the clock divider circuitry (e.g., 30) produces the low-speed clock signal (e.g., CLK_LS) with each of the first and second periods (e.g., four or five times the period of CLK_HS, respectively).

The control signal memory circuitry (e.g., 50) can be programmed to a different pattern, with the CLKSEL_SET signal dynamically switching to the new pattern synchronously (similar to the earlier discussion of CLK_FRZ). This could also be extended to have a shadow register providing two patterns that the user could synchronously, selectively, switch between, providing additional control and flexibility.

It will be understood that although this disclosure may sometimes refer to things like "bits," "data," "protocol encoding," or the like, these things are always represented by and embodied in concrete elements such as electrical signals or electronic circuit elements in all embodiments and forms of practice of the invention claimed herein. This invention does not purport to cover "bits," "data," etc., as abstractions or in any mental (as opposed to physical) use or manipulation. The claims herein cover only concrete, physical embodiments and implementations (e.g., electrical circuits and/or methods carried out using electrical circuits).

It will be understood that the foregoing is only illustrative of the principles of the invention, and that various modifications can be made by those skilled in the art without departing from the scope and spirit of the invention. For example, the basically 32-bit parallel bus width used for data in elements 10/120, 150, 160, and 170 is only illustrative, and any other parallel data bus width can be used instead if desired.

The invention claimed is:

1. Clock divider circuitry comprising:
    a plurality of registers connected in a closed-loop series, the plurality of registers operable to be clocked by a high-speed clock signal, and an output signal of a first register of the plurality of registers being a low-speed clock signal;
    bypass circuitry for selectively bypassing a second register of the plurality of registers in the series; and
    control circuitry clocked responsively to said low-speed clock signal for successively applying a plurality of control signals to the bypass circuitry to control when the bypass circuitry bypasses the second register.

2. The circuitry defined in claim 1 wherein the control circuitry comprises:
    a closed-loop shift register having a plurality of stages, the control signals being responsive to an output signal of a first stage of the plurality of stages.

3. The circuitry defined in claim 2 wherein the closed-loop shift register is clocked responsively to the low-speed clock signal.

4. The circuitry defined in claim 2 further comprising:
    freeze control circuitry for selectively stopping shifting of the closed-loop shift register.

5. The circuitry defined in claim 2 further comprising:
    memory circuitry for storing control data for use in producing the control signals; and
    set control circuitry for selectively loading the control data from the memory circuitry into the closed-loop shift register.

6. Deserializer circuitry comprising the clock divider circuitry defined in claim 1, and further comprising:
    serial data memory circuitry for serially accepting and storing a plurality of data bits that are received successively in synchronism with the high-speed clock signal; and
    parallel data memory circuitry for accepting, in parallel and in synchronism with the low-speed clock, at least a subplurality of the data bits in the serial memory circuitry.

7. The deserializer circuitry defined in claim 6 wherein the data bits that are received successively in synchronism with the high-speed clock signal include successive pluralities of actual data bits with at least one extra protocol encoding bit between each such plurality of actual data bits and the next such plurality of actual data bits.

8. The deserializer circuitry defined in claim 7 wherein the parallel data memory circuitry has capacity for storing only a subplurality of the actual data bits in one of the pluralities of actual data bits plus at least one extra protocol encoding bit.

9. The deserializer circuitry defined in claim 8 further comprising:
  extended parallel data memory circuitry having a plurality of portions, each of which can store parallel outputs of the parallel data memory circuitry; and
  routing circuitry for routing the parallel outputs of the parallel data memory circuitry to respective different ones of the portions in successive different cycles of the low-speed clock signal.

10. The deserializer circuitry defined in claim 9 further comprising:
  alignment control circuitry for changing phase of operation of the clock divider circuitry relative to location of the extra protocol encoding bits in the data bits that are received successively in synchronism with the high-speed clock signal until each extra protocol encoding bits is received in a predetermined location in the extended parallel data memory circuitry.

11. The deserializer circuitry defined in claim 10 further comprising:
  further extended parallel data memory circuitry having capacity for receiving in parallel from the extended parallel data memory circuitry all actual data bits contained in the parallel data memory, but with no extra capacity for extra protocol encoding bits embedded within those actual data bits.

12. A method of deserializing a serial data signal that includes successive pluralities of actual data bits with at least one extra protocol encoding bit between each such plurality of actual data bits and a next successive such plurality of actual data bits, the bits in the serial data signal being synchronized with a high-speed clock signal, the method comprising:
  producing from the high-speed clock signal a low-speed clock signal having different first and second clock signal periods at different times, the first period being proportional to a time required to receive a predetermined fraction of the number of bits in each of the pluralities of actual data bits, and the second period being proportional to the time required to receive said predetermined fraction plus at least one of the extra protocol encoding bits.

13. The method defined in claim 12 further comprising:
  using the high-speed clock signal to shift the serial data signal into multiple stages of serial data memory circuitry; and
  using the low-speed clock signal to transfer, in parallel, outputs of said multiple stages to parallel data memory circuitry.

14. The method defined in claim 13 further comprising:
  changing phase of the low-speed clock signal relative to locations of the extra protocol encoding bits in the serial data signal until the extra protocol encoding bits become stored in at least one predetermined location in the parallel data memory circuitry.

15. Circuitry for deserializing a serial data signal that includes successive pluralities of actual data bits with at least one extra protocol encoding bit between each such plurality of actual data bits and a next successive such plurality of actual data bits, the bits in the serial data signal being synchronized with a high-speed clock signal, comprising:
  clock divider circuitry for producing from the high-speed clock signal a low-speed clock signal having different first and second clock signal periods at different times, the first period being proportional to a time required to receive a predetermined fraction of the number of bits in each of the pluralities of actual data bits, and the second period being proportional to the time required to receive said predetermined fraction plus at least one of the extra protocol encoding bits.

16. The circuitry defined in claim 15 further comprising:
  serial data memory circuitry for shifting successive bits of the serial data signal into multiple stages of the serial data memory circuitry in synchronism with the high-speed clock signal; and
  parallel data memory circuitry for receiving, in parallel, outputs of multiple stages of the serial data memory circuitry in synchronism with the low-speed clock signal.

17. The circuitry defined in claim 16 further comprising:
  clock synchronization circuitry for changing phase of the low-speed clock signal relative to locations of the extra protocol encoding bits in the serial data signal until the extra protocol encoding bits become stored in at least one predetermined location in the parallel data memory circuitry.

18. The circuitry defined in claim 17 wherein the clock synchronization circuitry comprises:
  circuitry for changing when the clock divider circuitry produces the low-speed clock signal with the first period, and when the clock divider circuitry produces the low-speed clock signal with the second period.

19. The circuitry defined in claim 15 further comprising:
  clock select circuitry for controlling when the clock divider circuitry produces the low-speed clock signal with the first period, and when the clock divider circuitry produces the low-speed clock signal with the second period.

20. The circuitry defined in claim 15 further comprising:
  control signal memory circuitry for storing signals for determining a sequence in which the clock divider circuitry produces the low-speed clock signal with each of the first and second periods.

* * * * *